(12) United States Patent
Liu

(10) Patent No.: US 6,439,815 B1
(45) Date of Patent: Aug. 27, 2002

(54) FASTENING DEVICE ADAPTED FOR TIGHTENING A ROPE TO FASTEN GOODS ON A PLATFORM OF VEHICLE

(76) Inventor: Che-Sen Liu, 6F-3, No. 31, Sec. 3, Tung-Hsing Rd., Hsi Dist., Taichung City (TW)

( * ) Notice: Subject to any disclaimer, the term of this patent is extended or adjusted under 35 U.S.C. 154(b) by 0 days.

(21) Appl. No.: 09/766,913

(22) Filed: Jan. 22, 2001

(51) Int. Cl.[7] ............................ B60P 7/08
(52) U.S. Cl. ............ 410/106; 410/97; 410/101; 410/102; 410/115
(58) Field of Search ............ 410/96, 97, 101, 410/102, 106, 108, 110, 115, 116; 24/265 CD, 115 K; 296/39.1, 100.16; 224/403, 534, 568

(56) References Cited

U.S. PATENT DOCUMENTS

| | | | | |
|---|---|---|---|---|
| 3,173,539 A | * | 3/1965 | Looker | 410/97 X |
| 3,877,671 A | * | 4/1975 | Underwood et al. | 410/104 X |
| 4,850,769 A | * | 7/1989 | Matthews | 410/105 |
| 5,052,869 A | * | 10/1991 | Hansen, II | 410/111 |
| 5,302,064 A | * | 4/1994 | Davis | 410/115 |
| 5,599,055 A | * | 2/1997 | Brown | 410/97 X |
| 5,620,040 A | * | 4/1997 | Swanner | 296/100.16 |
| 5,772,369 A | * | 6/1998 | Lerman et al. | 410/96 |
| 6,065,916 A | * | 3/2000 | Swensen | 410/97 |
| 6,065,917 A | * | 5/2000 | Shambeau et al. | 410/107 |
| 6,213,696 B1 | * | 4/2001 | Austin | 410/106 |
| 6,296,163 B1 | * | 10/2001 | Kitao et al. | 410/101 |

* cited by examiner

Primary Examiner—Stephen T. Gordon
(74) Attorney, Agent, or Firm—Pitney, Hardin, Kipp & Szuch LLP

(57) ABSTRACT

A fastening device includes a mounting sheet which is adapted to have a lower major wall surface thereof secured to and overlying a platform of a vehicle. A plurality of fastening members are disposed on the upper major wall surface. Each fastening member includes a connecting portion secured on an upper major wall surface of the mounting sheet, and an anchoring portion which includes a proximate end hinged on the connecting portion and a distal end disposed opposite to the proximate end so as to be turnable to be normal to the upper major wall surface. As such, a rope is adapted to pass through the anchoring portions of selected ones of the fastening members to tense the rope for tightening any shape and size of goods on the mounting sheet.

6 Claims, 6 Drawing Sheets

FASTENING DEVICE ADAPTED FOR TIGHTENING A ROPE TO FASTEN GOODS ON A PLATFORM OF VEHICLE

BACKGROUND OF THE INVENTION

1. Field of the Invention

This invention relates to a fastening device, more particularly to a fastening device which is adapted for tightening a rope to fasten goods on a platform of a vehicle so as to prevent movement of the goods.

2. Description of the Related Art

A conventional method for fastening goods in a trunk of a car or a pick-up truck is that a rope passes through a plurality of hooks which are secured on the periphery of the truck so as to bind the goods. Such a method will result in unsteady fastening and movement of the goods in the trunk and a tendency to damage the goods.

SUMMARY OF THE INVENTION

The object of the present invention is to provide a fastening device which can tighten a rope to fasten firmly goods on a platform of a vehicle or the like.

According to this invention, the fastening device includes a mounting sheet with upper and lower major wall surfaces opposite to each other in a longitudinal direction. The lower major wall surface is adapted to be secured to and overlie a platform of a vehicle. A plurality of first fastening members and a plurality of second fastening members are disposed on the upper major wall surface. The first fastening members are in tandem in a first direction transverse to the longitudinal direction, and the second fastening members are in tandem in a second direction transverse to both the longitudinal and first directions. Each fastening member includes a connecting portion which is secured on the upper major wall surface, and an anchoring portion which includes a proximate end that is hinged on the connecting portion along an axis normal to the longitudinal direction, and a distal end that is disposed opposite to the proximate end so as to be turnable between a rest position, where the distal end lies over the upper major wall surface and extends transversely of the connecting portion, and a normal position, where the distal end extends away from and normal to the upper major wall surface. As such, a rope is adapted to pass through the anchoring portions of selected ones of the fastening members to tense the rope for tightening any shape and size of goods on the mounting sheet.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
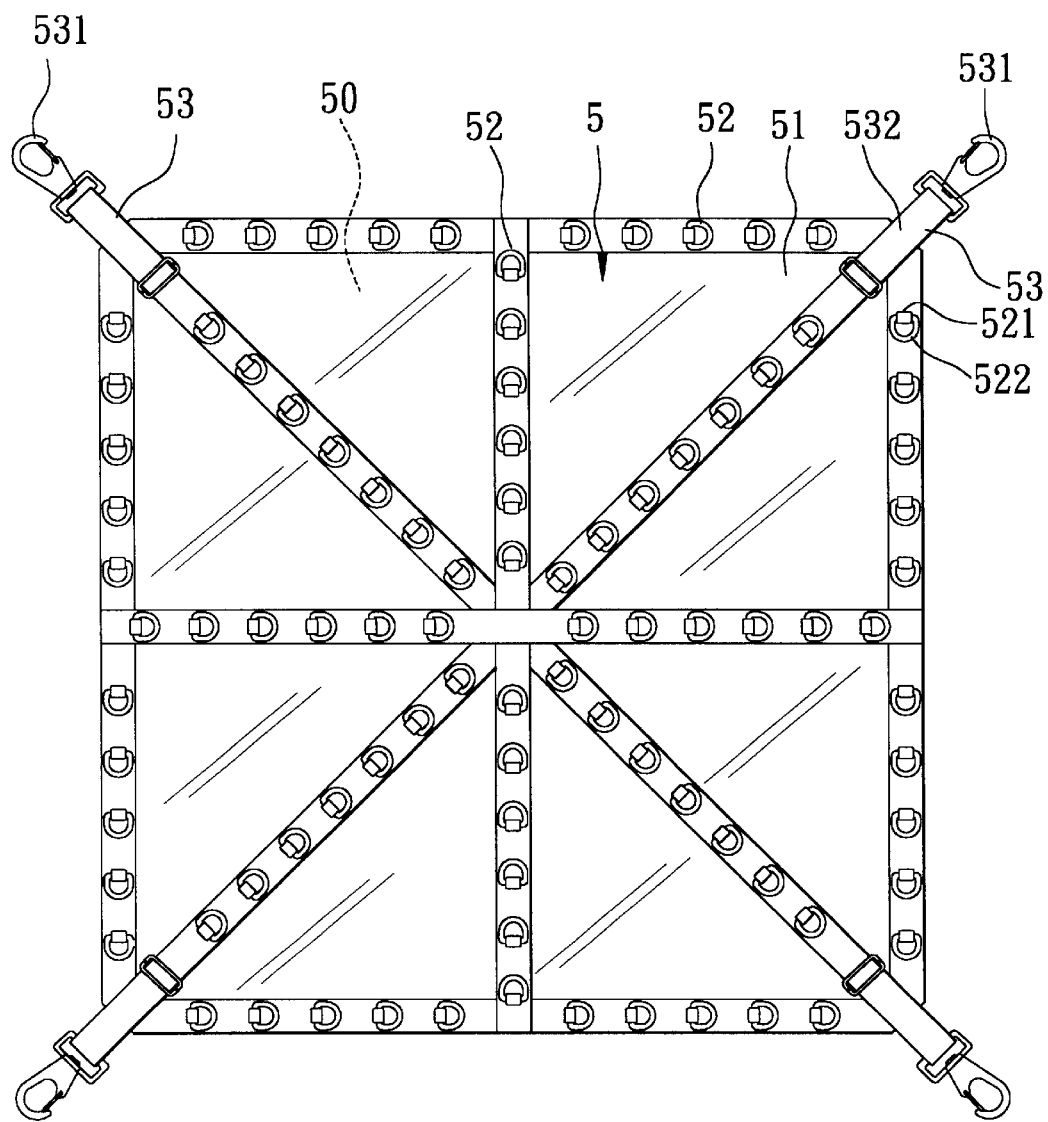
FIG. 1 is a top view of a first preferred embodiment of a fastening device according to this invention when stretched.
Figure 2:
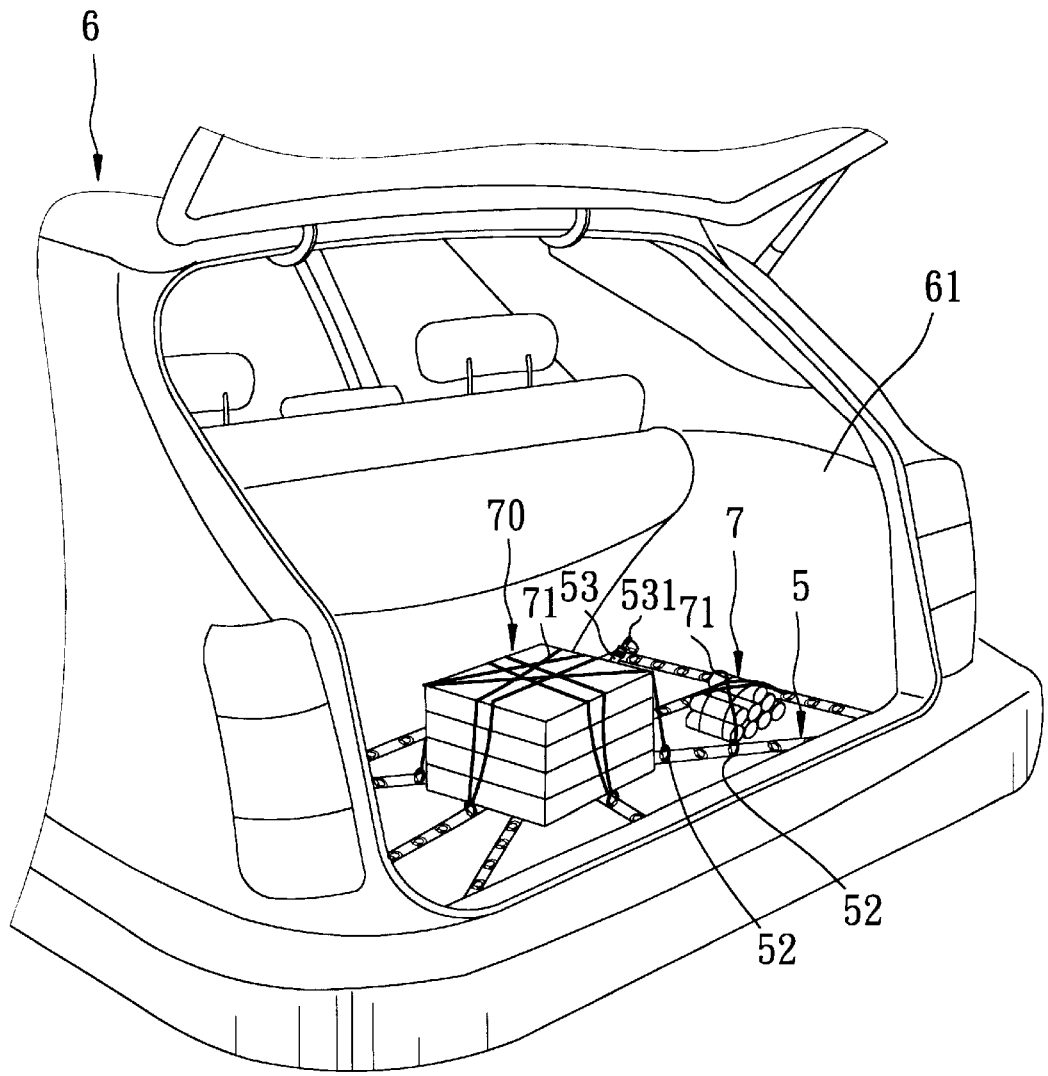
FIG. 2 is a schematic view showing the first preferred embodiment when used in a trunk of a car.

Referring to FIGS. 1 and 2, the preferred embodiment of the fastening device according to the present invention is shown to comprise a mounting sheet 5, and a plurality of first, second, third, and fourth fastening members 52 which are disposed securely on the mounting sheet 5.

The mounting sheet 5 is made of a flexible material so as to be adapted for rolling up, and has upper and lower major wall surfaces 51,50 opposite to each other in a longitudinal direction. The lower major wall surface 50 is adapted to overlie a platform of a trunk 61 of a car 6. Two pairs of stretchers 53 are disposed on a periphery of the mounting sheet 5. The stretchers 53 of each pair are aligned with each other in and extend along a diagonal line of the mounting sheet 5. Each stretcher 53 includes a band portion 532 which has a mounting end that is secured on the upper major wall surface 51 and a coupling end away from the upper major wall surface 51, and a hook portion 531 which is connected to the coupling end and which is adapted to anchor an anchored portion (not shown) on the corner of the trunk 61 so as to stretch and secure the mounting sheet 5 in the trunk 61. Preferably, the length of the band portion 532 between the mounting and coupling ends is adjustable for suiting different sizes of the trunk 61.

The first fastening members 52 are in tandem in a first direction transverse to the longitudinal direction. The second fastening members 52 are in tandem in a second direction transverse to both the longitudinal and first directions. The third and fourth fastening members 52 are in tandem along two diagonal lines of the upper major wall surface 51. Each fastening member 52 includes a connecting portion 521 which is secured on the upper major wall surface 51, and an anchoring portion 522 which has a proximate end that is hinged on the connecting portion 521 along an axis normal to the longitudinal direction, and a distal end that is disposed opposite to the proximate end so as to be turnable between a rest position, where the distal end lies over the upper major wall surface 51 and extends transversely of the connecting portion 521, and a normal position, where the distal end extends away from and normal to the upper major wall surface 51. In the normal position, a rope 71 can pass through the anchoring portions 522 of selected ones of the fastening members 52 to tense the rope 71 for tightening the goods 70,7 on the mounting sheet 5. As such, the fastening device according to this invention can fasten firmly any shape and size of goods 70,7 on a platform of a car or a pick-up truck.

Figure 3:
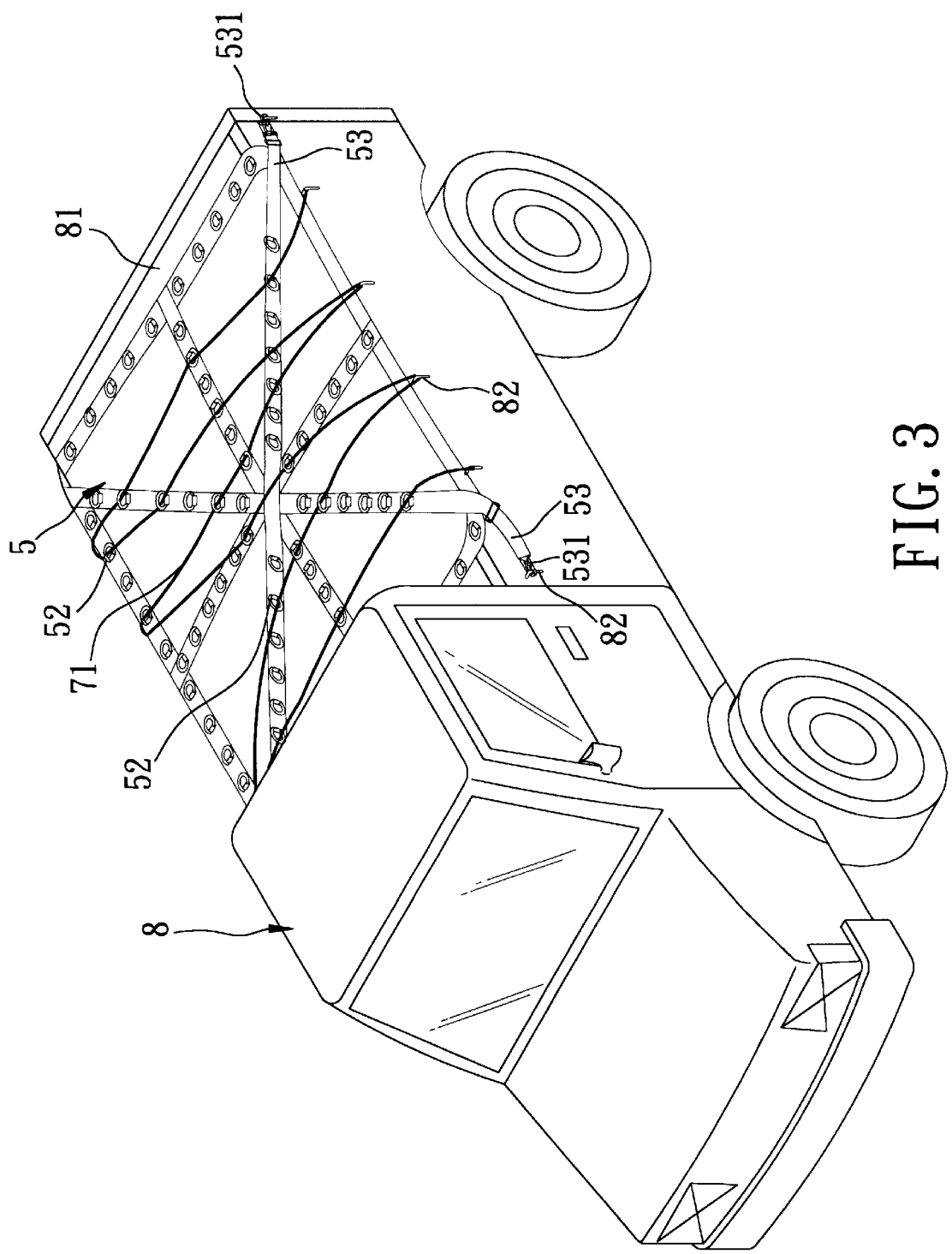
FIG. 3 is a schematic view showing the first preferred embodiment when used in a pick-up truck.

As shown in FIG. 3, goods are first placed in the trunk 81 of the truck 8. Then, the mounting sheet 5 is brought to lie on the goods and is secured to the anchored portions 82 disposed on the trunk 81 by the hook portions 531 of the stretchers 53 which anchor on the trunk 81. Finally, the rope 71 passes through the selected ones of the fastening members 52 and the anchored portions 82 to be tightened for fastening the goods in the trunk 81.

Figure 4:
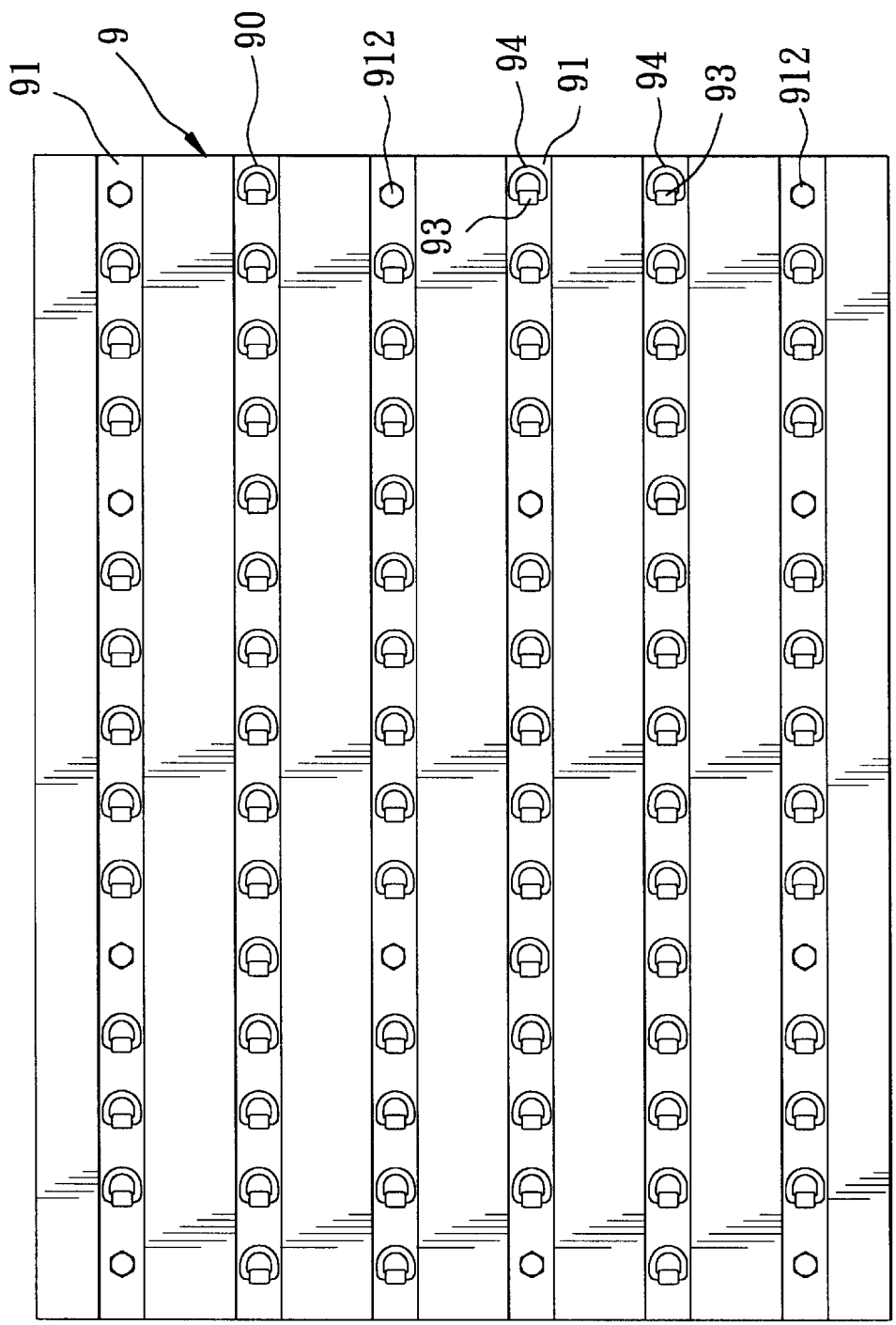
FIG. 4 is a top view of a second preferred embodiment of the fastening device according to this invention when stretched.
Figure 5:
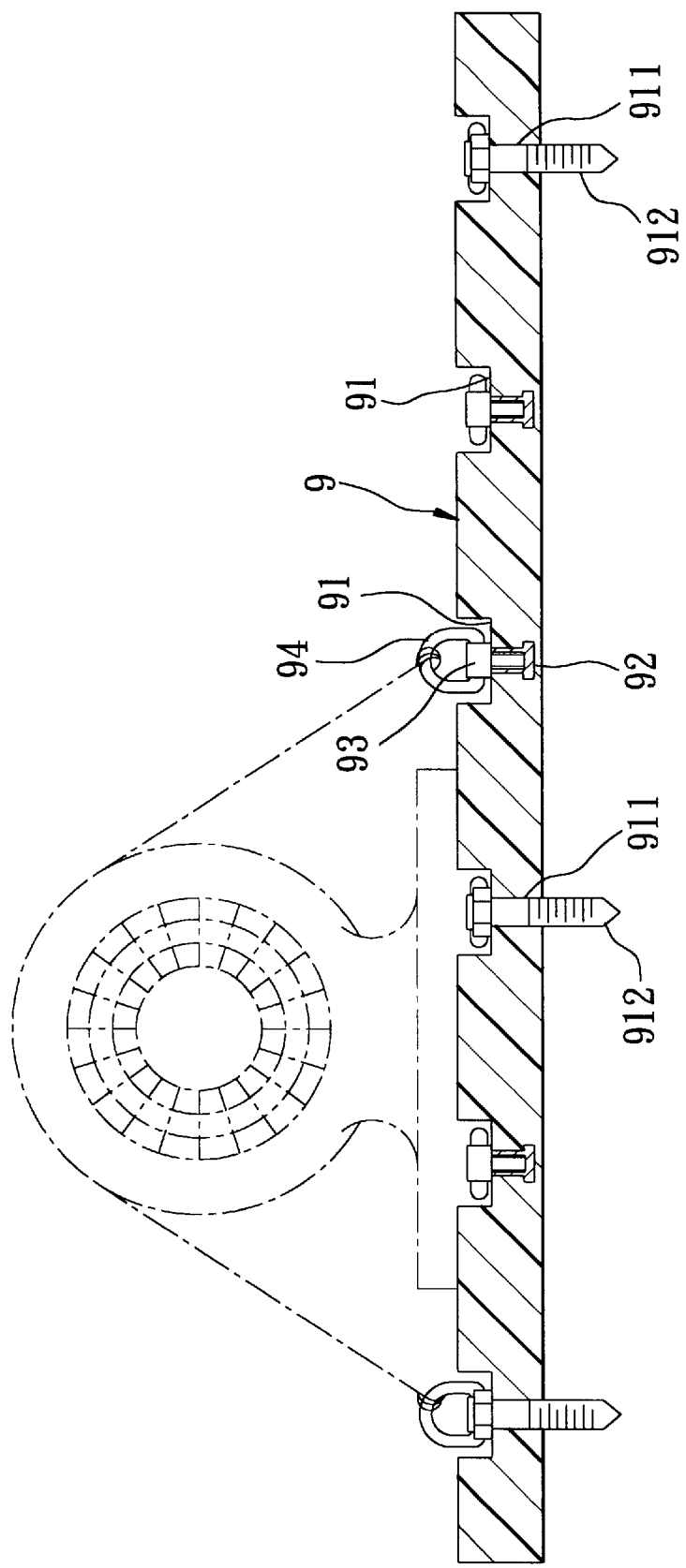
FIG. 5 is a partly sectional view of the second preferred embodiment.
Figure 6:
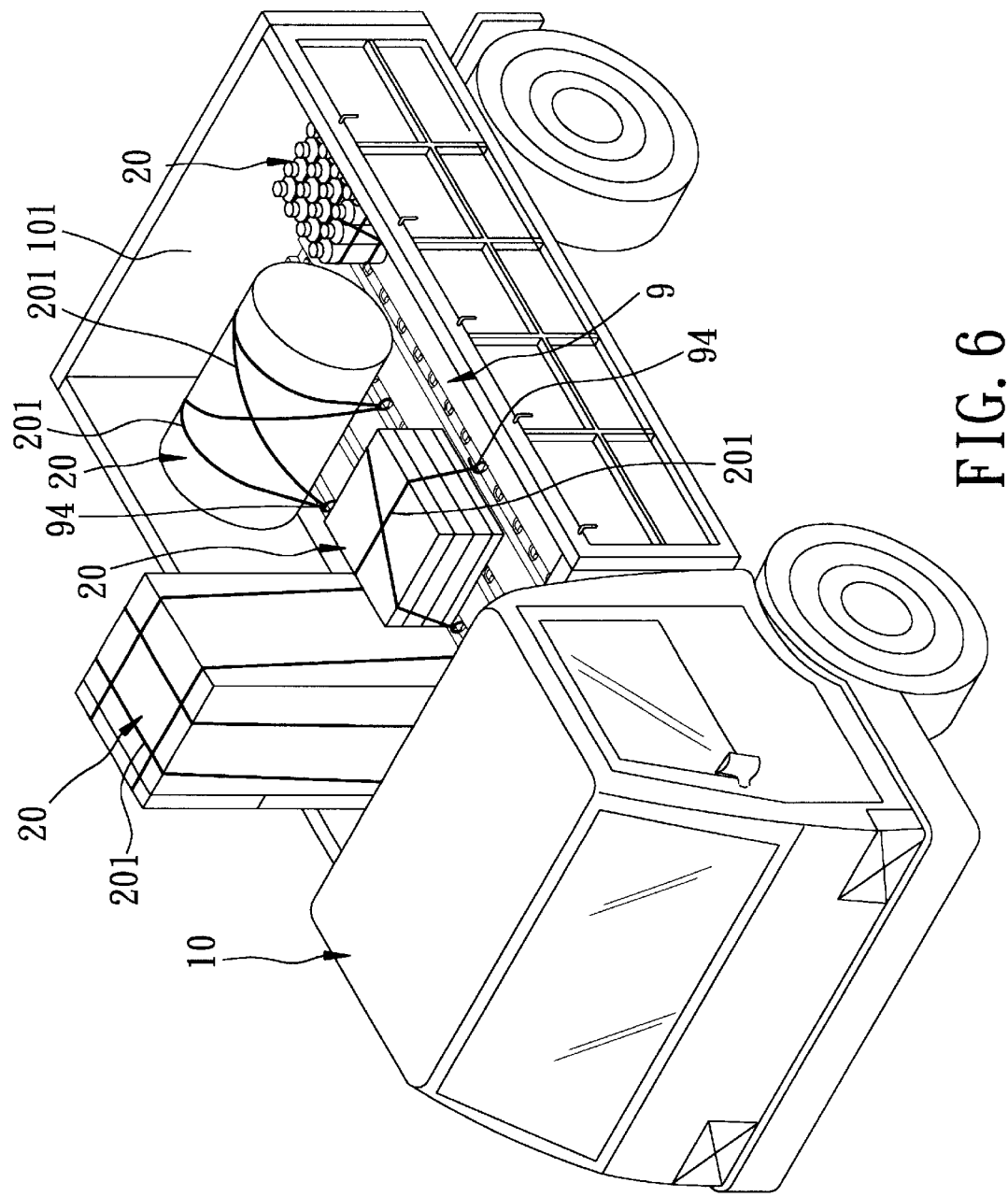
FIG. 6 is a schematic view showing the second preferred embodiment when used in a pick-up truck.

As shown in FIGS. 4 to 6, the second preferred embodiment of the fastening device according to this invention is shown to include a mounting sheet 9 which is made of a rigid plastic material, and has a plurality of elongate concaved portions 91 which are formed on an upper major wall surface thereof and which are arranged parallel to one another in the first direction. Each concaved portion 91 is formed with a plurality of internally threaded members 92 which are integrally formed with the mounting sheet 9 such that the connecting portions 93 of a plurality of fastening members 90 engage threadedly the internally threaded members 92. The fastening members 90 further have anchoring portions 94 which are hinged on the connecting portions 93 to be turnable between the rest and normal positions described above. In addition, a plurality of through holes 911 are formed in the concaved portions 91. Each of the through holes 911 extends from the upper major wall surface through the lower major wall surface of the mounting sheet 9 such that a screw fastener 912 can pass through the through hole 911 to engage threadedly a screw hole in the platform of the trunk 101 of the truck 10 so as to secure the mounting sheet 9 on the truck 10. Thus, any shape and size of goods 20 can be fastened firmly on the mounting sheet 9 by tightening the ropes 201 which pass through the selected ones of the anchoring portions 94 of the fastening members 90.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A fastening device adapted for tightening a rope to fasten goods on a platform of a vehicle, said fastening device comprising:

a mounting sheet having upper and lower major wall surfaces opposite to each other in a longitudinal direction, and adapted to have said lower major wall surface secured to and overlying the platform; and a plurality of first fastening members and a plurality of second fastening members disposed on said upper major wall surface, said first fastening members being in tandem in a first direction transverse to the longitudinal direction, said second fastening members being in tandem in a second direction transverse to both the longitudinal and first directions, each of said first and second fastening members including a connecting portion which is secured on said upper major wall surface, and an anchoring portion which includes a proximate end hinged on said connecting portion along an axis normal to the longitudinal direction, and a distal end disposed opposite to said proximate end so as to be turnable between a rest position, where said distal end lies over said upper major wall surface and extends transversely of said connecting portion, and a normal position, where said distal end extends away from and normal to said upper major wall surface such that the rope is adapted to pass through said anchoring portions of selected ones of said first and second fastening members to tense the rope for tightening the goods on said mounting sheet, wherein said mounting sheet is made of a rigid plastic material, wherein said upper major wall surface is formed with a plurality of elongate concaved portions which are arranged parallel to one another in the first direction, said first and second fastening members being disposed on said concaved portions, at least one of said first fastening members on one of said concaved portions being aligned with one of said first fastening members on another one of said concaved portions in the second direction so as to constitute said second fastening members, and wherein said concaved portions are formed with a plurality of through holes that extend respectively from said upper major wall surface through said lower major wall surface in the longitudinal direction so as to be adapted to secure said mounting sheet on the vehicle by virtue of screw fasteners.

2. A fastening device adapted for tightening a rope to fasten goods on a platform of a vehicle, said fastening device comprising:

a mounting sheet having upper and lower major wall surfaces opposite to each other in a longitudinal direction, and adapted to have said lower major wall surface secured to and overlying the platform; and a plurality of first fastening members and a plurality of second fastening members disposed on said upper major wall surface, said first fastening members being in tandem in a first direction transverse to the longitudinal direction, said second fastening members being in tandem in a second direction transverse to both the longitudinal and first directions, each of said first and second fastening members including a connecting portion which is secured on said upper major wall surface, and an anchoring portion which includes a proximate end hinged on said connecting portion along an axis normal to the longitudinal direction, and a distal end disposed opposite to said proximate end so as to be turnable between a rest position, where said distal end lies over said upper major wall surface and extends transversely of said connecting portion, and a normal position, where said distal end extends away from and normal to said upper major wall surface such that the rope is adapted to pass through said anchoring portions of selected ones of said first and second fastening members to tense the rope for tightening the goods on said mounting sheet, wherein said mounting sheet is made of a rollable flexible material.

3. The fastening device of claim 2, further comprising two pairs of stretchers disposed on a periphery of said mounting sheet, said stretchers of each pair being aligned with each other in and extending along a diagonal line of said mounting sheet for stretching said mounting sheet.

4. The fastening device of claim 3, wherein each of said stretchers includes a band portion which has a mounting end secured on said upper major wall surface and a coupling end extending from said mounting end away from said upper major wall surface, and a hook portion which is connected to said coupling end and adapted to anchor on the vehicle.

5. The fastening device of claim 4, wherein said band portion defines a length between said mounting and coupling ends, said length being adjustable.

6. The fastening device of claim 5, further comprising a plurality of third fastening members and a plurality of fourth fastening members which are disposed on said upper major wall surface and which are respectively in tandem along two diagonal lines of said upper major wall surface.

* * * * *